US009608674B2

United States Patent
Rofougaran et al.

(10) Patent No.: US 9,608,674 B2
(45) Date of Patent: *Mar. 28, 2017

(54) METHOD AND SYSTEM FOR 60 GHZ DISTRIBUTED COMMUNICATION

(71) Applicant: AVAGO TECHNOLOGIES GENERAL IP (SINGAPORE) PTE. LTD., Singapore (SG)

(72) Inventors: Ahmadreza Rofougaran, Newport Coast, CA (US); Maryam Rofougaran, Rancho Palos Verdes, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 33 days.

This patent is subject to a terminal disclaimer.

(21) Appl. No.: 14/638,711

(22) Filed: Mar. 4, 2015

(65) Prior Publication Data

US 2015/0180515 A1    Jun. 25, 2015

Related U.S. Application Data

(63) Continuation of application No. 12/895,514, filed on Sep. 30, 2010, now Pat. No. 9,008,593.

(51) Int. Cl.
*H04B 1/00* (2006.01)
*H04B 7/06* (2006.01)
(Continued)

(52) U.S. Cl.
CPC ......... *H04B 1/0071* (2013.01); *H04B 7/0608* (2013.01); *H04W 88/06* (2013.01); *H04W 88/04* (2013.01)

(58) Field of Classification Search
CPC .......... H04B 1/40; H04B 10/1149; H04B 2001/0491; H04B 1/04; H04B 1/0071; H04B 7/0608; H04W 88/06; H04W 88/04
See application file for complete search history.

(56) References Cited

U.S. PATENT DOCUMENTS 5,280,472 A    1/1994    Gilhousen et al.
5,379,455 A    1/1995    Koschek
(Continued)

FOREIGN PATENT DOCUMENTS

EP    0 685 973    12/1995
GB    2 354 674    3/2001
(Continued)

OTHER PUBLICATIONS

Definition of term "Device" located at http://dictionary.reference.com/browse/device.
(Continued)

*Primary Examiner* — Gennadiy Tsvey
(74) *Attorney, Agent, or Firm* — Oblon, McClelland, Maier & Neustadt, L.L.P.

(57) ABSTRACT

Methods and systems for 60 GHz distributed communication are disclosed and may include generating IF signals from baseband signals in a computing device with wireless capability. The IF signals may be communicated to remote RF modules within the computing device via coaxial lines. The IF signals may be up-converted to RF signals and transmitted via the RF modules. The IF signals in the coaxial lines may be tapped via taps coupled to the RF modules. The baseband signals may comprise video data, Internet streamed data, and/or data from a local data source. The RF signals may be communicated to a display device. Control signals for the RF devices may be communicated utilizing the coaxial lines. One or more of the RF devices may be selected based on a direction to a receiving device. The remote RF devices may comprise mixers. The RF signals may comprise 60 GHz signals.

18 Claims, 5 Drawing Sheets

(51) Int. Cl.
*H04W 88/06* (2009.01)
*H04W 88/04* (2009.01)

(56) References Cited

U.S. PATENT DOCUMENTS

| | | | |
|---|---|---|---|
| 5,461,646 | A | 10/1995 | Anvari |
| 5,519,691 | A | 5/1996 | Darcie et al. |
| 5,533,011 | A | 7/1996 | Dean et al. |
| 5,781,847 | A | 7/1998 | Clarke et al. |
| 5,802,173 | A | 9/1998 | Hamilton-Piercy et al. |
| 5,805,983 | A | 9/1998 | Naidu et al. |
| 5,901,144 | A | 5/1999 | Maki et al. |
| 5,969,837 | A | 10/1999 | Farber et al. |
| 6,023,458 | A | 2/2000 | Tweedy et al. |
| 6,070,063 | A | 5/2000 | Yoshizawa et al. |
| 6,078,622 | A | 6/2000 | Boytim et al. |
| 6,405,018 | B1 | 6/2002 | Reudink et al. |
| 6,449,477 | B1 | 9/2002 | Weissman |
| 6,801,767 | B1 | 10/2004 | Schwartz et al. |
| 7,426,231 | B1 | 9/2008 | Dorfman |
| 7,460,082 | B2 | 12/2008 | Li et al. |
| 7,561,904 | B2 | 7/2009 | Lagnado |
| 7,640,035 | B2 | 12/2009 | Jang et al. |
| 7,787,854 | B2 | 8/2010 | Conyers et al. |
| 8,005,050 | B2 | 8/2011 | Scheinert et al. |
| 8,010,116 | B2 | 8/2011 | Scheinert |
| 8,159,399 | B2 | 4/2012 | Dorsey et al. |
| 2001/0046840 | A1 | 11/2001 | Kim |
| 2003/0045284 | A1 | 3/2003 | Copley |
| 2003/0207668 | A1* | 11/2003 | McFarland .......... H03H 7/0153 455/3.01 |
| 2004/0051598 | A1 | 3/2004 | Vann et al. |
| 2006/0253872 | A1 | 11/2006 | Shoji et al. |
| 2007/0218845 | A1 | 9/2007 | Efland et al. |
| 2007/0224931 | A1 | 9/2007 | Fitton et al. |
| 2007/0280370 | A1 | 12/2007 | Liu |
| 2008/0014948 | A1 | 1/2008 | Scheinert |
| 2008/0058018 | A1 | 3/2008 | Scheinert |
| 2009/0061940 | A1 | 3/2009 | Scheinert et al. |
| 2009/0258652 | A1 | 10/2009 | Lambert et al. |
| 2009/0316609 | A1 | 12/2009 | Singh |
| 2010/0087227 | A1 | 4/2010 | Francos et al. |
| 2010/0202557 | A1 | 8/2010 | Harris |
| 2011/0063169 | A1 | 3/2011 | Chen et al. |
| 2011/0135013 | A1 | 6/2011 | Wegener |
| 2011/0141895 | A1 | 6/2011 | Zhang |

FOREIGN PATENT DOCUMENTS

| | | |
|---|---|---|
| JP | 2010-503263 | 1/2010 |
| WO | WO 2008/027213 | 3/2008 |

OTHER PUBLICATIONS

Definition of term "within" located at http://dictionary.reference.com/browse/within.

* cited by examiner

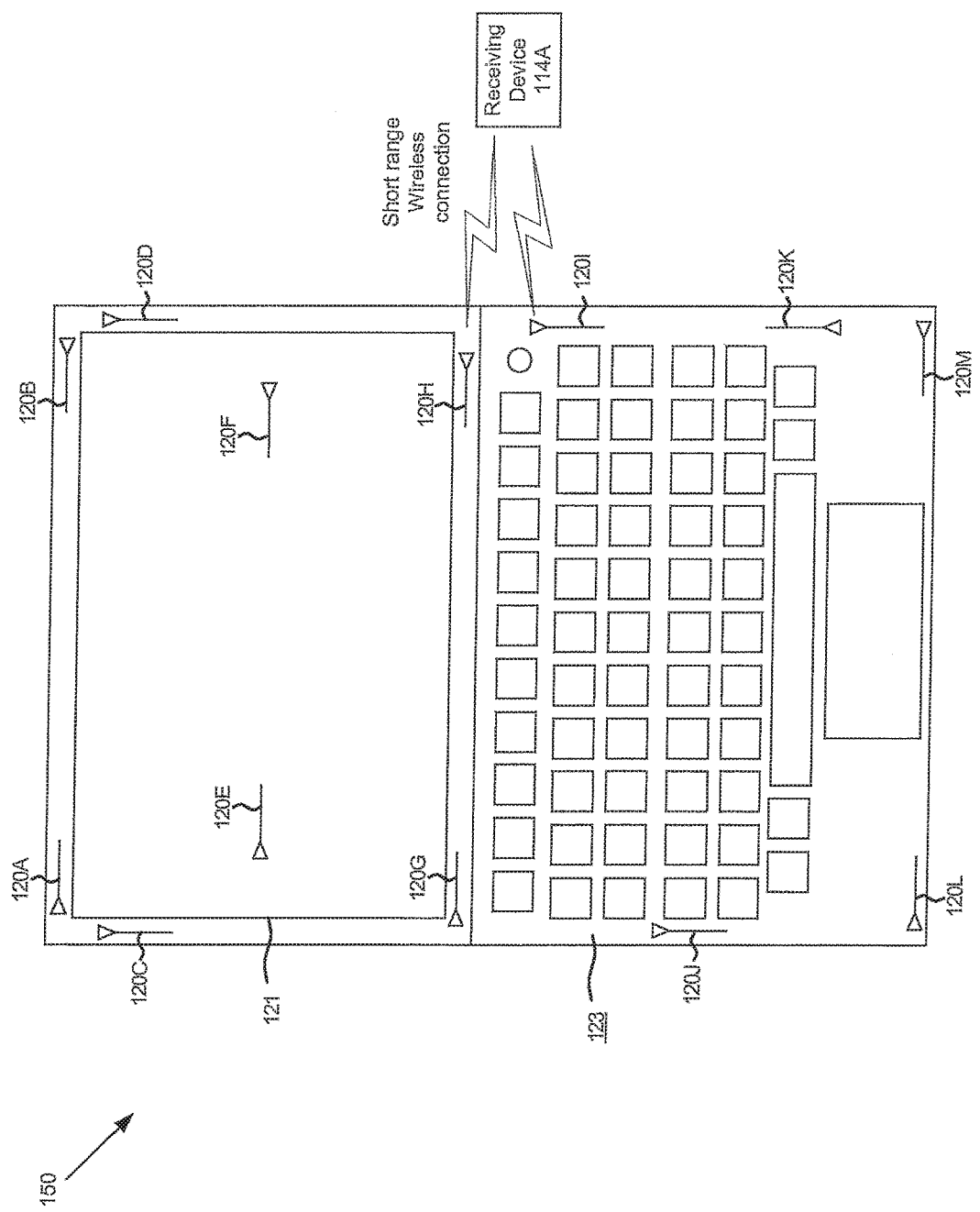

METHOD AND SYSTEM FOR 60 GHZ DISTRIBUTED COMMUNICATION

CROSS REFERENCE TO RELATED APPLICATIONS

This application is a Continuation of and is based upon and claims the benefit of priority under 35 U.S.C. §120 for U.S. Ser. No. 12/895,514, filed Sep. 30, 2010. This application makes reference to U.S. patent application Ser. No. 12/895,503, filed on Sep. 30, 2010; U.S. patent application Ser. No. 12/895,520, filed on Sep. 30, 2010; U.S. patent application Ser. No. 12/895,528, filed on Sep. 30, 2010; U.S. patent application Ser. No. 12/895,547, filed on Sep. 30, 2010; U.S. patent application Ser. No. 12/895,537, filed on Sep. 30, 2010; and U.S. patent application Ser. No. 12/895,573, filed on Sep. 30, 2010. Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to wireless communication. More specifically, certain embodiments of the invention relate to a method and system for 60 GHz distributed communication.

BACKGROUND OF THE INVENTION

In 2001, the Federal Communications Commission (FCC) designated a large contiguous block of 7 GHz bandwidth for communications in the 57 GHz to 64 GHz spectrum. This frequency band may be used by the spectrum users on an unlicensed basis, that is, the spectrum is accessible to anyone, subject to certain basic, technical restrictions such as maximum transmission power and certain coexistence requirements. The communications taking place in this band are often referred to as '60 GHz communications'. With respect to the accessibility of this part of the spectrum, 60 GHz communications may be somewhat similar to other forms of unlicensed spectrum use, for example Wireless LANs or Bluetooth in the 2.4 GHz ISM bands. However, communications at 60 GHz may be significantly different in aspects other than accessibility. For example, 60 GHz signals may possess markedly different communications channel and propagation characteristics, at least due to the fact that 60 GHz radiation is partly absorbed by oxygen in the air, thereby leading to higher attenuation with distance. On the other hand, since a very large bandwidth of 7 GHz is available, very high data rates may be achieved. Among the applications for 60 GHz communications are wireless personal area networks, wireless high-definition television signal, for example from a set top box to a display, or Point-to-Point links.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for 60 GHz distributed communication, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1B is a block diagram illustrating a laptop computer with an exemplary 60 GHz distributed communication system, in accordance with an embodiment of the invention.

DETAILED DESCRIPTION OF THE INVENTION

Certain aspects of the invention may be found in a method and system for 60 GHz distributed communication. Exemplary aspects of the invention may comprise generating IF signals from baseband signals in a wireless communication device with wireless capability. The generated IF signals may be communicated to a plurality of remote RF modules within the computing device via one or more coaxial lines. The IF signals may be up-converted to RF signals in one or more of the remote RF modules and the RF signals may be transmitted via one or more antennas in the remote RF modules. The IF signals in the coaxial lines may be tapped via taps coupled to the plurality of remote RF modules. The baseband signals may comprise video data, Internet streamed data, and/or data from a local data source. The RF signals may be communicated to a display device. Control signals for the plurality of remote RF devices may be communicated utilizing the coaxial lines. One or more of the plurality of remote RF devices may be selected based on a direction to a receiving device for the transmitted RF signals. The plurality of remote RF devices may comprise mixers. The RF signals may comprise 60 GHz signals.

Figure 1A:
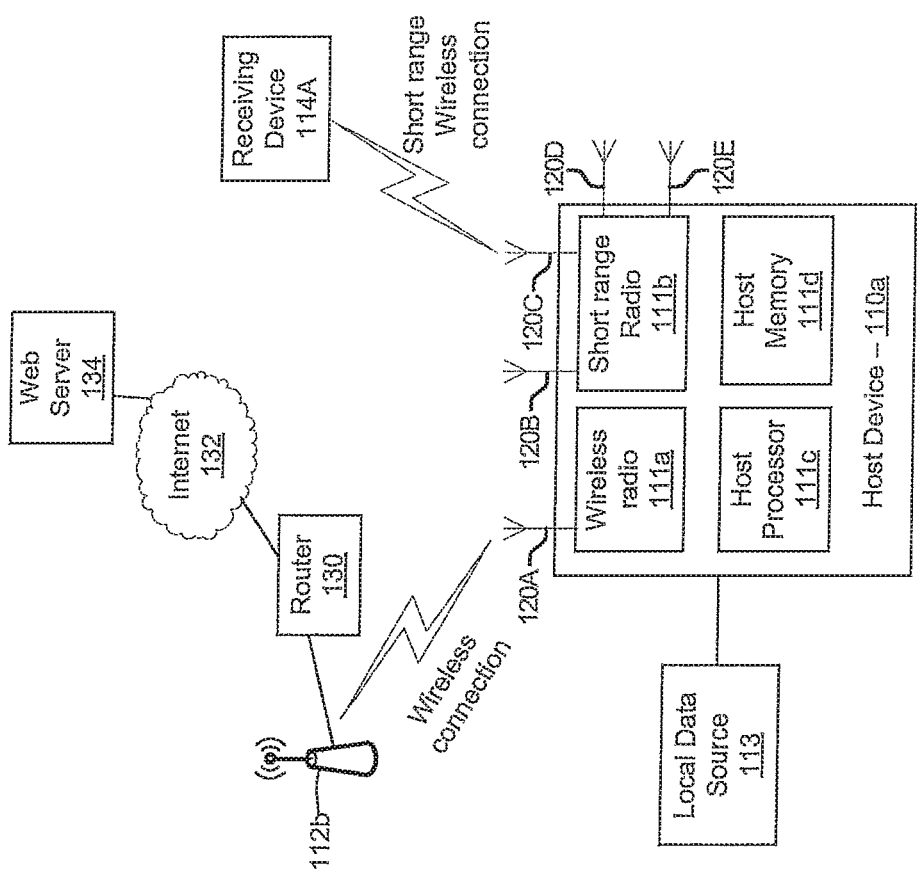
FIG. 1A is a diagram illustrating an exemplary wireless communication system, in accordance with an embodiment of the invention.

FIG. 1A is a diagram illustrating an exemplary wireless communication system, in accordance with an embodiment of the invention. Referring to FIG. 1A, there is shown an access point 112b, a host device 110a, a local data source 113, a receiving device 114a, a router 130, the Internet 132 and a web server 134. The host device 110a, or computer, for example, may comprise a wireless radio 111a, a short-range radio 111b, a host processor 111c, and a host memory 111d, and a plurality of antennas 120A-120E. There is also shown a wireless connection between the wireless radio 111a and the access point 112b, and a short-range wireless connection between the short-range radio 111b and the receiving device 114a.

The host device 110a may comprise a computer or set-top box device, for example, that may be operable to receive signals from data sources, process the received data, and communicate the processed data to receiving devices. Accordingly, the host device 110a may comprise processors, such as the host processor 111c, storage devices such as the host memory 111d, and communication devices, such as the wireless radio 111a and the short range radio 111b.

The wireless radio 111a may comprise suitable circuitry, logic, interfaces, and/or code that may be operable to communicate wireless signals to between the host device 110a and external devices, such as the access point 112b, for example. Accordingly, the wireless radio 111a may comprise amplifiers, mixers, analog-to-digital and digital-to-analog converters, phase-locked loops, and clock sources, for example, that enable the communication of wireless signals.

The short-range radio 111b may comprise suitable circuitry, logic, interfaces, and/or code that may be operable to communicate wireless signals over short distances. Accordingly, the frequency of transmission/reception may be in the 60 GHz range, which may enable short-range communications due to the attenuation of signals in air at this frequency. Similarly, the short-range radio 111b may comprise amplifiers, mixers, analog-to-digital and digital-to-analog converters, phase-locked loops, and clock sources, for example, that enable the communication of wireless signals.

The host processor 111c may comprise suitable circuitry, logic, interfaces, and/or code that may be operable to received control and/or data information, which may comprise programmable parameters, to determine an operating mode of the wireless radio 111a and the short-range radio 111b. For example, the host processor 111c may be utilized to select a specific frequency for a local oscillator, a specific gain for a variable gain amplifier, configure the local oscillator and/or configure the variable gain amplifier for operation in accordance with various embodiments of the invention. Moreover, the specific frequency selected and/or parameters needed to calculate the specific frequency, and/or the specific gain value and/or the parameters, which may be utilized to calculate the specific gain, may be stored in the host memory 111d via the host processor 111c, for example. The information stored in host memory 111d may be transferred to the wireless radio 111a and/or the short-range radio 111b from the host memory 111d via the host processor 111c.

The host memory 111d may comprise suitable circuitry, logic, interfaces, and/or code that may be enabled to store a plurality of control and/or data information, including parameters needed to calculate frequencies and/or gain, and/or the frequency value and/or gain value. The host memory 111d may store at least a portion of the programmable parameters that may be manipulated by the host processor 111c.

The access point 112b may comprise suitable circuitry, logic, interfaces, and/or code that may be enabled to provide wireless signals to one or more devices within its range. The access point 112b may be coupled to the router 130, thereby enabling connection to the Internet for devices that are operable to communicate with the access point 112b.

The local data source 113 may comprise suitable circuitry, logic, interfaces, and/or code that may be enabled to communicate data to the host device 110a. For example, the local data source may comprise a DVD player, and MP3 player, and/or a set-top box.

The receiving device 114A may comprise suitable circuitry, logic, interfaces, and/or code that may be enabled to receive data communicated by the host device 110a via the short-range radio 111b. In an exemplary embodiment of the invention, the receiving device 114A may comprise an HDTV that may be operable to display HD video signals and playback associated audio signals.

The antennas 120A-120E may comprise suitable circuitry, logic, interfaces, and/or code that may be operable to transmit and/or receive wireless signals. For example, the antenna 120A may be operable to transmit and receive wireless signals between the access point 112b and the wireless radio 111a, and the antennas 120B-120E may be operable to communicate signals between the short range radio 111b and one or more external devices, such as the receiving devices 114A.

The router 130 may comprise suitable circuitry, logic, interfaces, and/or code that may be enabled to communicate signals between the access point 112b and the Internet. In this manner, devices within range of the access point 112b may be enabled to connect to the Internet.

The web server 134 may comprise a remote server that may be operable to store content that may be accessed by the host device 110a via the Internet 132. For example, the web server 134 may comprise a movie provider server and may be operable to communicate a desired movie to the host device 110a via the Internet for display via the receiving device 114A.

Frequently, computing and communication devices may comprise hardware and software to communicate using multiple wireless communication standards. The wireless radio 111a may be compliant with a mobile communications standard, for example. There may be instances when the wireless radio 111a and the short-range radio 111b may be active concurrently. For example, it may be desirable for a user of the computer or host device 110a to access the Internet 132 in order to consume streaming content from the Web server 134. Accordingly, the user may establish a wireless connection between the host device 110a and the access point 112b. Once this connection is established, the streaming content from the Web server 134 may be received via the router 130, the access point 112b, and the wireless connection, and consumed by the computer or host device 110a.

It may be further desirable for the user of the host device 110a to communicate the streaming content to the receiving device 114a, which may comprise a TV or other type of display, for example. Accordingly, the user of the host device 110a may establish a short-range wireless connection with the receiving device 114a. Once the short-range wireless connection is established, and with suitable configurations on the computer enabled, the streaming content may be displayed by the receiving device 114a. In instances where such advanced communication systems are integrated or located within the host device 110a, the radio frequency (RF) generation may support fast-switching to enable support of multiple communication standards and/or advanced wideband systems like, for example, Ultrawideband (UWB) radio. Other applications of short-range communications may be wireless High-Definition TV (W-HDTV), from a set top box to a video display, for example. W-HDTV may require high data rates that may be achieved with large bandwidth communication technologies, for example UWB and/or 60-GHz communications.

In another embodiment of the invention, the local data source 113 may be operable to provide data to be displayed by the receiving device 114a via the host device 110a. For example, the local data source may comprise a DVD player or a digital video recorder. The local data source may communicate with the host device 110*a* via a wired connection or via a wireless connection, either directly with the host device 110*a* or via the access point 112*b*.

In an embodiment of the invention, the short range radio 111*b* may comprise a plurality of antennas 120*b*-120E and frequency up-conversion devices throughout the host device 110*a* for communicating high frequency RF signals. The short range radio 111*b* may comprise a baseband and IF stage with a single high power PA that may communicate IF signals over thin coaxial lines. Taps may be configured to couple the IF signals from the coaxial lines to the frequency up-conversion devices before being communicated to the plurality of antennas. In this manner, IF signals may be amplified by a single PA and subsequently up-converted to 60 GHz, for example, for transmission via a plurality of antennas 120B-120E without the need for multiple PAs with excessive power requirements. The invention is not limited to the number of antennas shown in FIG. 1A. Accordingly, any number of antennas may be integrated in the host device 110*a*, depending on space limitations and desired RF transmission directionality.

FIG. 1B is a block diagram illustrating a laptop computer with an exemplary 60 GHz distributed communication system, in accordance with an embodiment of the invention. Referring to FIG. 1B, there is shown a laptop computer comprising a display 121, keyboard 123, and a plurality of antennas 120A-120M.

The antennas 120A-120M may be substantially similar to the antennas 120A-120E described with respect to FIG. 1A, and may comprise antennas coupled to a plurality of remote RF devices throughout the laptop 150. In this manner, one or more antenna configurations may be enabled, depending on the location of the receiving device, such as the receiving device 114A, and the antenna configuration that results in the greatest signal strength, lowest bit error rate, highest data throughput, lowest latency, and/or the optimum of any other desired wireless communication characteristic.

The antennas 120A-120M may be coupled to remote RF devices throughout the laptop 150. The remote RF devices may receive IF signals from a baseband and IF module via thin coaxial lines, described with respect to FIG. 2, and may be operable to up-convert received IF signals to RF signals. In this manner, lower frequency signals may be communicated throughout the laptop 150 to the antennas that result in desired signal quality. This may enable a single high-power PA stage that amplifies the IF signals that are then up-converted to RF in the remote RF modules.

In operation, a short-range wireless communication channel may be enabled between the laptop 150 and the receiving device 114A. A plurality of antenna configurations may be assessed for a desired performance characteristic, such as signal strength, bit error rate, data throughput, and/or latency, for example. The remote RF device configuration with the resulting desired performance may then be enabled to receive IF signals via coaxial lines from a centrally located baseband and IF module, and up-convert the signals to RF before transmitting via the appropriate antennas 120A-120M. In this manner, short-range communications may be enabled to one or more devices independent of its location in proximity with the laptop 150.

Furthermore, the frequency of the communicated signals may be different for different enabled antennas 120A-120M, thereby allowing a plurality of signals to be transmitted concurrently. In this manner, a plurality of IF signals may be communicated via coaxial lines to a plurality of remote RF devices, which may up-convert the IF signals to different RF frequencies, or subbands, for transmission. These subbands may be reused in different geographic locations ti mitigate the effect on co-channel interference. For example, if a certain location has RF interference in one of the subbands, other frequencies may be utilized. Accordingly, the laptop 150 may store the frequency of blocker or other interference signals based on the location of the laptop, as determined by GPS, for example.

Figure 2:
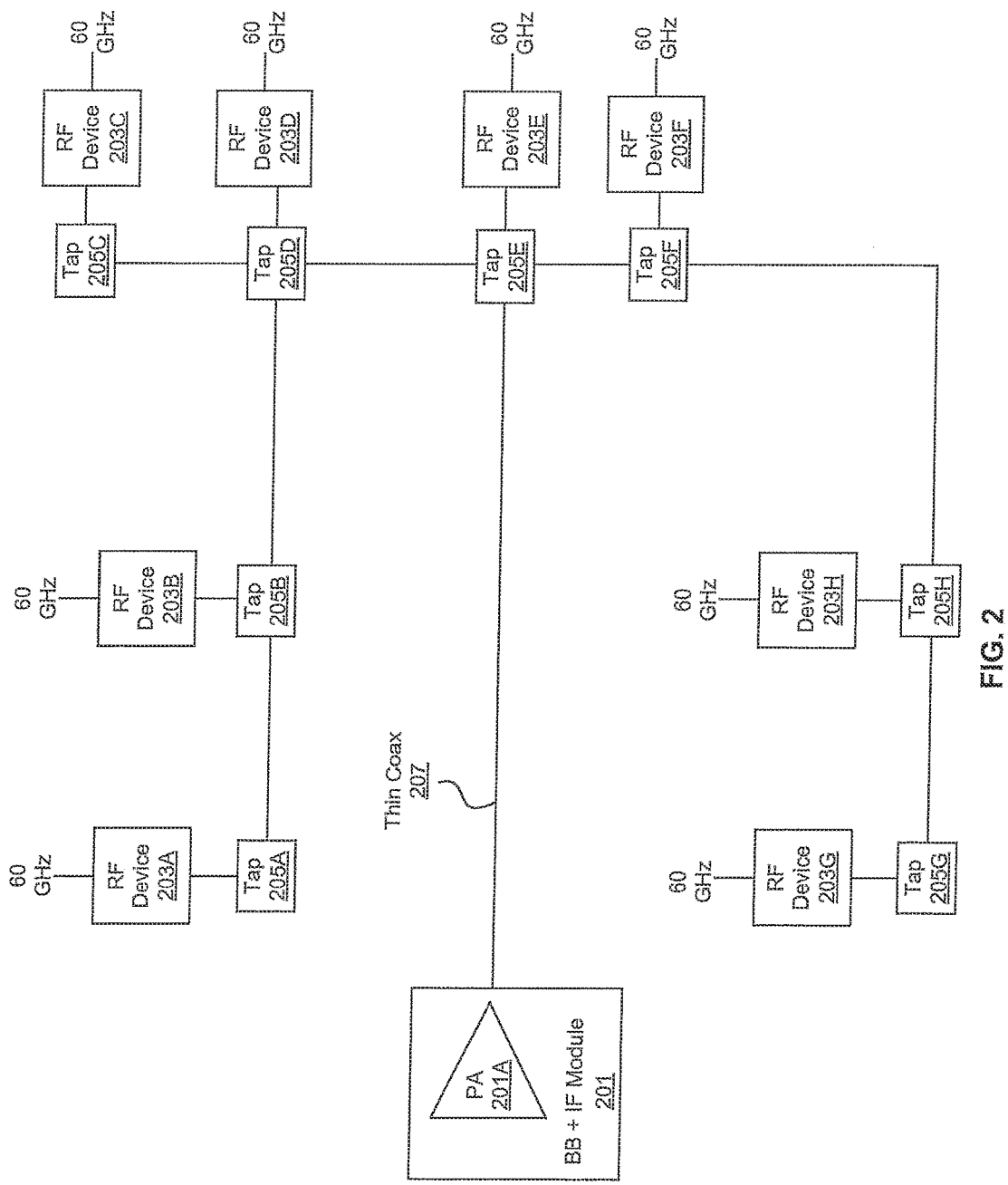
FIG. 2 is a block diagram illustrating an exemplary 60 GHz communication system, in accordance with an embodiment of the invention.

FIG. 2 is a block diagram illustrating an exemplary 60 GHz communication system, in accordance with an embodiment of the invention. Referring to FIG. 2, there is shown a baseband and IF module 201, RF devices 203A-203H, taps 205A-205H, and thin coaxial line 207.

The baseband and IF module 201 may comprise suitable circuitry, logic, interfaces, and/or code that may be operable to generate IF signals comprising baseband data. The baseband and IF module 201 may comprise one or more processors, such as a baseband processor, memory, and frequency conversion devices, for example. The processor or processors in the baseband and IF module 201 may be any suitable processor or controller such as a CPU, DSP, ARM, or any type of integrated circuit processor, and may be enabled to update and/or modify programmable parameters and/or values in a plurality of components, devices, and/or processing elements in the baseband and IF module 201. At least a portion of the programmable parameters may be stored in memory, such as the host memory 111*d*, for example, or dedicated memory in the baseband and IF module 201.

The RF devices 203A-203H may comprise suitable circuitry, logic, interfaces, and/or code that may be operable to convert received IF signals to RF frequencies and transmit the RF signals via one or more antennas. The RF devices 203A-203H may be configured remotely throughout a wireless communication device, such as the host device 110*a*, described with respect to FIG. 1, so that 60 GHz signals may be communicated from a plurality of directions, depending on the location of a device that is the intended receiving device. By incorporating frequency up-conversion capability in the RF devices 203A-203H, IF signals may be communicated from a single high power PA in the baseband and IF module 201 via the thin coaxial line 207.

The taps 205A-205H may comprise suitable circuitry, logic, interfaces, and/or code that may be operable to couple a portion of the IF signal being communicated via the thin coaxial line 207 to the associated RF devices 203A-203H. In this manner, taps may be configured to couple signals when it may be desired to transmit RF signals via one or more of the RF devices 203A-203H.

The thin coaxial line 207 may comprise coaxial conductors separated by a dielectric material, for example, and may be operable to communicate IF signals throughout a device, such as the host device 110*a*. In another embodiment of the invention, the thin coaxial line 207 may be operable to provide DC power for various devices within the host device 110*a*, such as the RF devices 203A-203H.

In operation, the baseband and IF module 201 may process baseband signals for transmission via the RF devices 203A-203H. The baseband signals may be up-converted to IF and amplified by a PA prior to communication via the thin coaxial line 207, which may distribute the IF signals throughout the device, such as the host device 110*a*, for example. One or more of the taps 205A-205H may be enabled to tap a portion of the communicated IF signals to associated RF devices 203A-203H. The RF devices 203A-203H may up-convert the tapped IF signals to RF frequencies, such as 60 GHz, for example, before transmission via one or more antennas in the RF devices 203A-203H. In this manner, an RF power amplifier is not required at each RF device 203A-203H, which would require more power than by utilizing a single PA, such as the PA 201A, at the IF stage in the baseband and IF module 201.

In addition to IF signals to be up-converted and transmitted, the thin coaxial line 207 may communicate low frequency control signals to the RF devices 203A-203H and the taps 205A-205H. The control signals may be utilized to configure which of the taps 205A-205H may be activated to tap off part of the IF signals for transmission by the appropriate RF device 202A-203H. In addition, the control signals may be utilized to configure the up-conversion performed in the RF devices 203A-203H. In this manner, only those RF devices 203A-203H that have antennas in an appropriate direction for a desired receiving device may be activated, further reducing power requirements.

Figure 3:
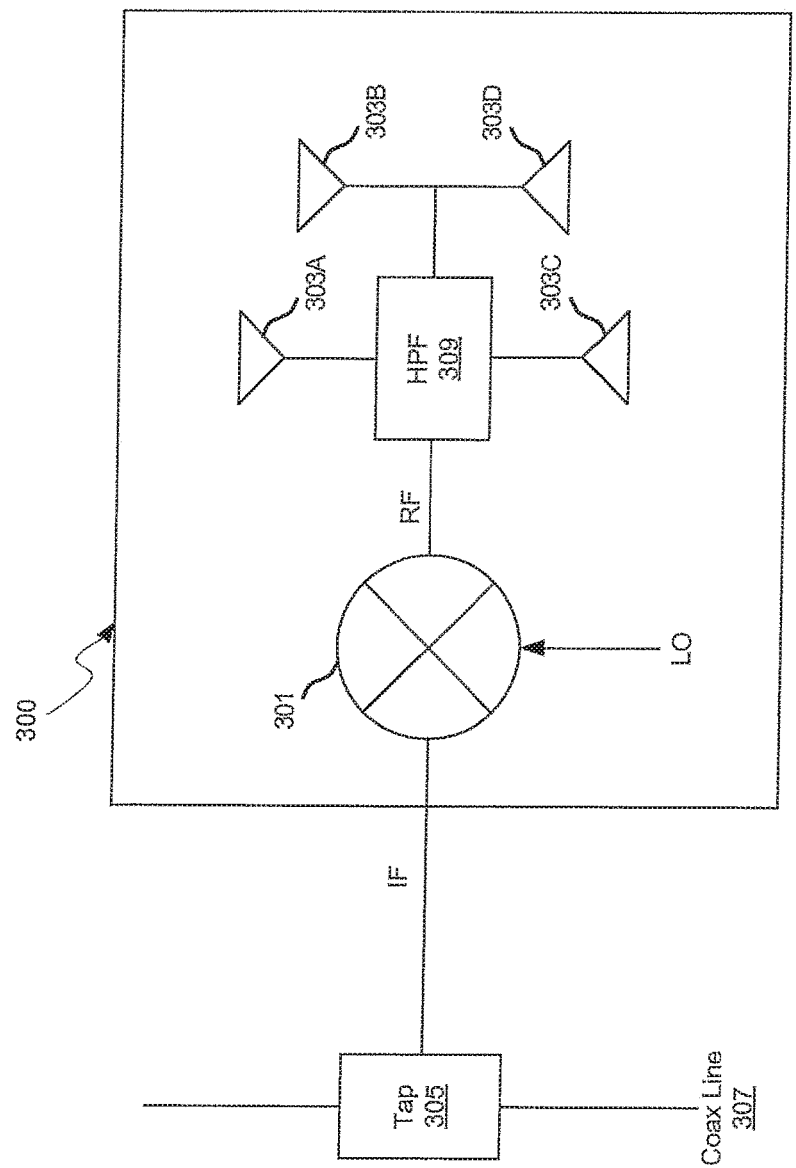
FIG. 3 is a block diagram illustrating an exemplary RF device, in accordance with an embodiment of the invention.

FIG. 3 is a block diagram illustrating an exemplary RF device, in accordance with an embodiment of the invention. Referring to FIG. 3, there is shown a tap 305, a coaxial line 307 and an RF device 300 comprising a mixer 301, a plurality of antennas 303A-303D, and high-pass filter 309. The antennas 303A-303E may be operable to transmit and/or receive RF signals. The tap 305 and the coaxial line 307 may be substantially similar to the taps 205A-205H and the coaxial line 207 described with respect to FIG. 2.

The mixer 301 may comprise suitable circuitry, logic, interfaces, and/or code that may be operable to frequency shift a received input signal. For example, the mixer 301 may receive an IF input signal and generate an RF output signal. The mixer 301 may also receive as an input signal, an LO signal that may be utilized to up-convert the received IF signal to RF frequencies.

The high-pass filter 309 may comprise suitable circuitry, logic, interfaces, and/or code that may be operable to attenuate low-frequency signals, defined as signals below a configurable corner frequency, and allow frequencies above the corner frequency to pass. For example, if sum and difference signals are generated by the mixer 301 based on the LO signal and received IF signal, the high-pass filter 309 may allow only the high frequency RF signal to pass to the antennas 303A-303E.

In operation, control signals in the coaxial line 307 may configure the tap 305 to tap off a portion of an IF signal communicated via the coaxial line 307 and communicate it to the mixer 301. The LO signal may be utilized to up-convert the IF signal to RF frequencies, and the high-pass filter 309 may filter out all but the desired signal at a frequency above a configurable corner frequency of the high-pass filter 309. The filtered RF signal may then be communicated to one or more antennas of the antennas 303A-303E. The control signals may also be utilized to configure the frequency of the LO signal, thereby configuring the frequency of the RF signal to be communicated.

Figure 4:
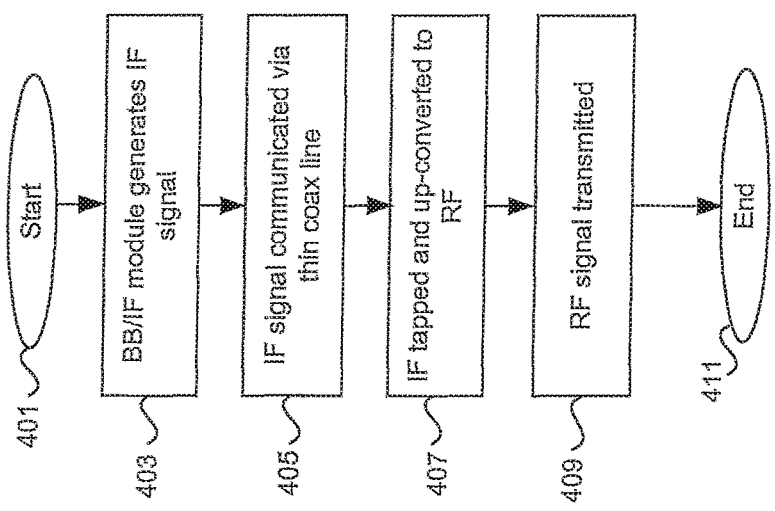
FIG. 4 is a block diagram illustrating exemplary steps in 60 GHz distributed communication, in accordance with an embodiment of the invention.

FIG. 4 is a block diagram illustrating exemplary steps in 60 GHz distributed communication, in accordance with an embodiment of the invention. Referring to FIG. 4, after start step 401, in step 403, the baseband and IF module generates an IF signal utilizing baseband processed data to be transmitted. In step 405, the generated IF signal may be communicated via thin coaxial line. In step 407, the IF signal may be tapped off by one or more taps and up-converted to RF. In step 409, the RF signals may be transmitted by one or more antennas, followed by end step 411.

In an embodiment of the invention, a method and system may comprise generating IF signals from baseband signals in a wireless communication device 110a with wireless capability. The generated IF signals may be communicated to a plurality of remote RF modules 203A-203H, within the communication device 110a via one or more coaxial lines 207, 307. The remote RF modules 203A-203H, may be configured by a processor 111c in the wireless communication device 110a. The IF signals may be up-converted to RF signals in one or more of the remote RF modules 203A-203H, and the RF signals may be transmitted via one or more antennas 303 in the remote RF modules 203A-203H. The IF signals may be amplified by a power amplifier prior to being communicated via the coaxial lines. The IF signals in the coaxial lines 207, 307 may be tapped via taps 205A-205H, 305 coupled to the plurality of remote RF modules 203A-203H. The baseband signals may comprise video data, streamed Internet data, and/or data from a local data source 113. The RF signals may be communicated to a display device. Control signals for the plurality of remote RF devices 203A-203H, may be communicated utilizing the coaxial lines 207, 307. One or more of the plurality of remote RF devices 203A-203H, may be selected based on a direction to a receiving device 114A for the transmitted RF signals. The plurality of remote RF devices 203A-203H, may comprise mixers. The RF signals may comprise 60 GHz signals.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for 60 GHz distributed communication.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for wireless communication, the method comprising:
in a wireless communication device comprising a body and a plurality of remote RF modules within said body of said wireless communication device, the plurality of remote RF modules providing no additional power amplification,
generating an IF signal from a baseband signal in said wireless communication device;
amplifying said IF signal with a power amplifier in a final amplification stage prior to conveyance to the remote RF modules via one or more coaxial lines, the amplified IF signal being an analog signal;
communicating the amplified IF signal, over a first communication path that includes a common coaxial line in said body of said wireless communication device to a first remote RF module that operates in a first RF band, and over a second communication path that includes the common coaxial line to a second RF module that operates in a second RF band that is different that the first RF band;
up-converting the amplified IF signal to a first RF signal in the first RF band at the first remote RF module, and a second RF signal in the second RF band at the second RF module;
communicating a first low frequency control signal at a lower frequency band than the IF signal to the first remote RF module and a second low frequency signal to the second RF module over the common coaxial line; and
concurrently transmitting said first RF signal via a first antenna and transmitting the second RF signal via a second antenna.

2. The method according to claim 1, comprising splitting the amplified IF signal at a first tap to provide a tapped portion of the amplified IF signal to the first remote RF module, and providing another tapped portion of the amplified IF signal to the second RF module.

3. The method according to claim 1, further comprising generating with circuitry the first low frequency control signal.

4. The method according to claim 1, wherein said baseband signal comprises one or more of: video data, streamed Internet data, and/or data from a local data source.

5. The method according to claim 1, wherein said transmitting the first RF signal comprises transmitting said first RF signal to a display device.

6. The method according to claim 1, wherein said transmitting comprises transmitting the first RF signal over a plurality of antennas.

7. The method according to claim 1, wherein said first remote RF module comprises a mixer.

8. The method according to claim 1, wherein the first RF band comprise 60 GHz.

9. The method of claim 1, wherein the up-converting is directly up-converting.

10. A system for wireless communication, the system comprising:
one or more circuits in a body of a wireless communication device, said one or more circuits comprising a plurality of remote RF modules within said body of said wireless communication device, the plurality of remote RF modules providing no additional power amplification, wherein said one or more circuits are configured to
generate an IF signal from a baseband signal in said wireless communication device;
amplify the IF signal with a power amplifier as a final amplification stage to create amplified IF signal, the amplified IF signal being an analog signal;
communicate the amplified IF signal, over a first communication path that includes a common coaxial line within said body of said wireless communication device to a first remote RF module that operates in a first RF band, and over a second communication path that includes the common coaxial line to a second RF module that operates in a second RF band that is different that the first RF band;
up-convert the amplified IF signal to a first RF signal in the first RF band at the first remote RF module, and a second RF signal in the second RF band at the second RF module;
communicate a first low frequency control signal at a lower frequency band than the IF signal to the first remote RF module and a second low frequency signal to the second RF module over the common coaxial line; and
concurrently transmit said first RF signal via a first antenna and transmitting the second RF signal via a second antenna.

11. The system according to claim 10, wherein said one or more circuits are configured to split the amplified IF signal at a first tap to provide a tapped portion of the amplified IF signal to the first remote RF module, and providing another tapped portion of the amplified IF signal to the second RF module.

12. The system according to claim 10, wherein said one or more circuits are configured to generate the first low frequency control signal.

13. The system according to claim 10, wherein said baseband signal comprises one or more of: video data, streamed Internet data, and/or data from a local data source.

14. The system according to claim 10, wherein said one or more circuits are configured to transmit said first RF signal to a display.

15. The system according to claim 10, further comprising a third antenna, wherein said first RF signal is also transmitted over the third antenna.

16. The system according to claim 10, wherein said first remote RF module comprises a mixer.

17. The system according to claim 10, wherein the first RF band comprise 60 GHz.

18. The system of claim 10, wherein the one or more circuits are configured to directly up-convert an amplified IF signal to the first RF signal.

\* \* \* \* \*